(12) United States Patent
Lentner

(10) Patent No.: US 10,967,472 B2
(45) Date of Patent: Apr. 6, 2021

(54) POSITION DETECTION DEVICE

(71) Applicant: Hammill Manufacturing Company, Co-op Tool Division, Maumee, OH (US)

(72) Inventor: Greg Lentner, Monclova, OH (US)

(73) Assignee: Hammill Manufacturing Company, Co-op Tool Divison, Maumee, OH (US)

( * ) Notice: Subject to any disclaimer, the term of this patent is extended or adjusted under 35 U.S.C. 154(b) by 421 days.

(21) Appl. No.: 16/134,442

(22) Filed: Sep. 18, 2018

(65) Prior Publication Data

US 2020/0086443 A1   Mar. 19, 2020

(51) Int. Cl.
| | | |
|---|---|---|
| *B23Q 17/00* | (2006.01) | |
| *F16B 2/02* | (2006.01) | |
| *B23Q 3/08* | (2006.01) | |
| *B25B 5/06* | (2006.01) | |

(52) U.S. Cl.
CPC .............. *B23Q 17/003* (2013.01); *F16B 2/02* (2013.01); *B23Q 3/082* (2013.01); *B25B 5/064* (2013.01)

(58) Field of Classification Search
CPC .... B23Q 17/003; B23Q 17/002; B23Q 17/00; B23Q 3/06; B23Q 3/082; B23Q 15/24; B25B 5/16; B25B 5/122; B25B 5/127; B25B 5/064; B25B 5/068; F16B 2/02; F15B 15/28; F15B 15/2807
USPC ...................................... 269/25, 32
See application file for complete search history.

(56) References Cited

U.S. PATENT DOCUMENTS

| | | | | |
|---|---|---|---|---|
| 5,845,897 A | * | 12/1998 | Tunkers ................... | B25B 5/122 269/32 |
| 6,736,384 B2 | * | 5/2004 | Yokota ................. | B23Q 17/002 269/24 |
| 9,951,799 B2 | * | 4/2018 | Kawakami .............. | B25B 5/062 |

* cited by examiner

*Primary Examiner* — Orlando E Aviles
*Assistant Examiner* — Robert F Neibaur
(74) *Attorney, Agent, or Firm* — McHale & Slavin, P.A.

(57) ABSTRACT

A position detecting device having a clamp body with a movable piston rod. A plurality of energy harvesting microswitches is mounted along a bottom of the piston rod using pin actuators to operate each microswitch depending on the piston rod position. The piston rod has a plurality of cutouts constructed and arranged to engage said pin actuators upon actuation of each microswitch, indicating a position which is transmitted wirelessly through the antenna. The antenna used to transmit a signal upon activation of a microswitch.

8 Claims, 10 Drawing Sheets

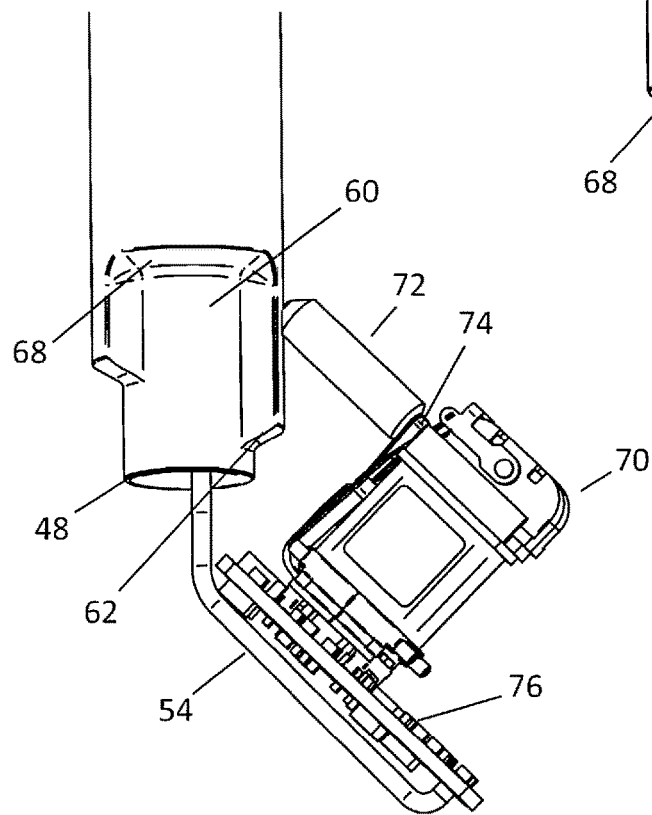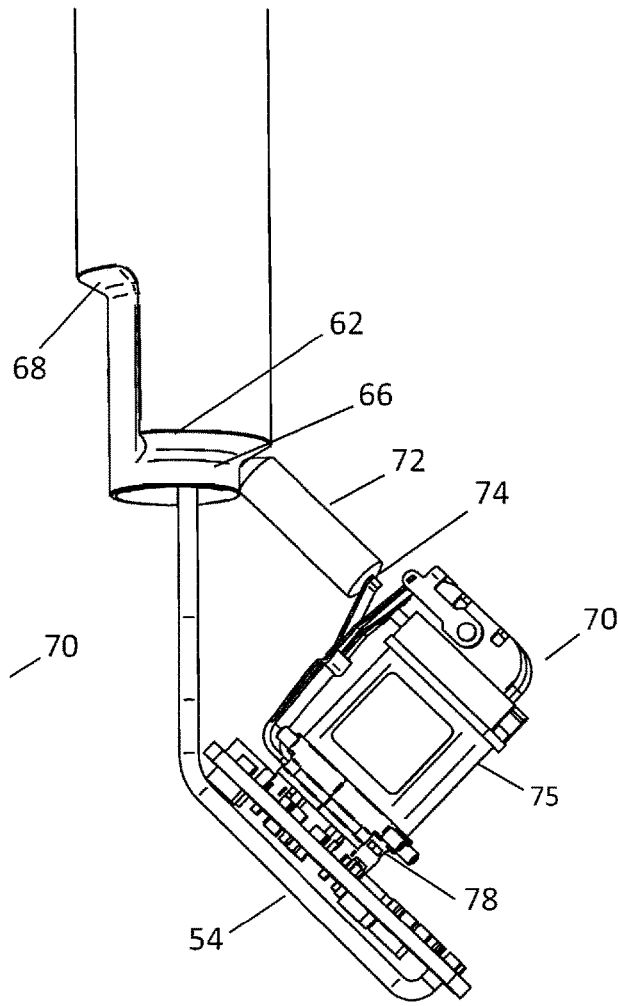
FIG. 7
FIG. 8

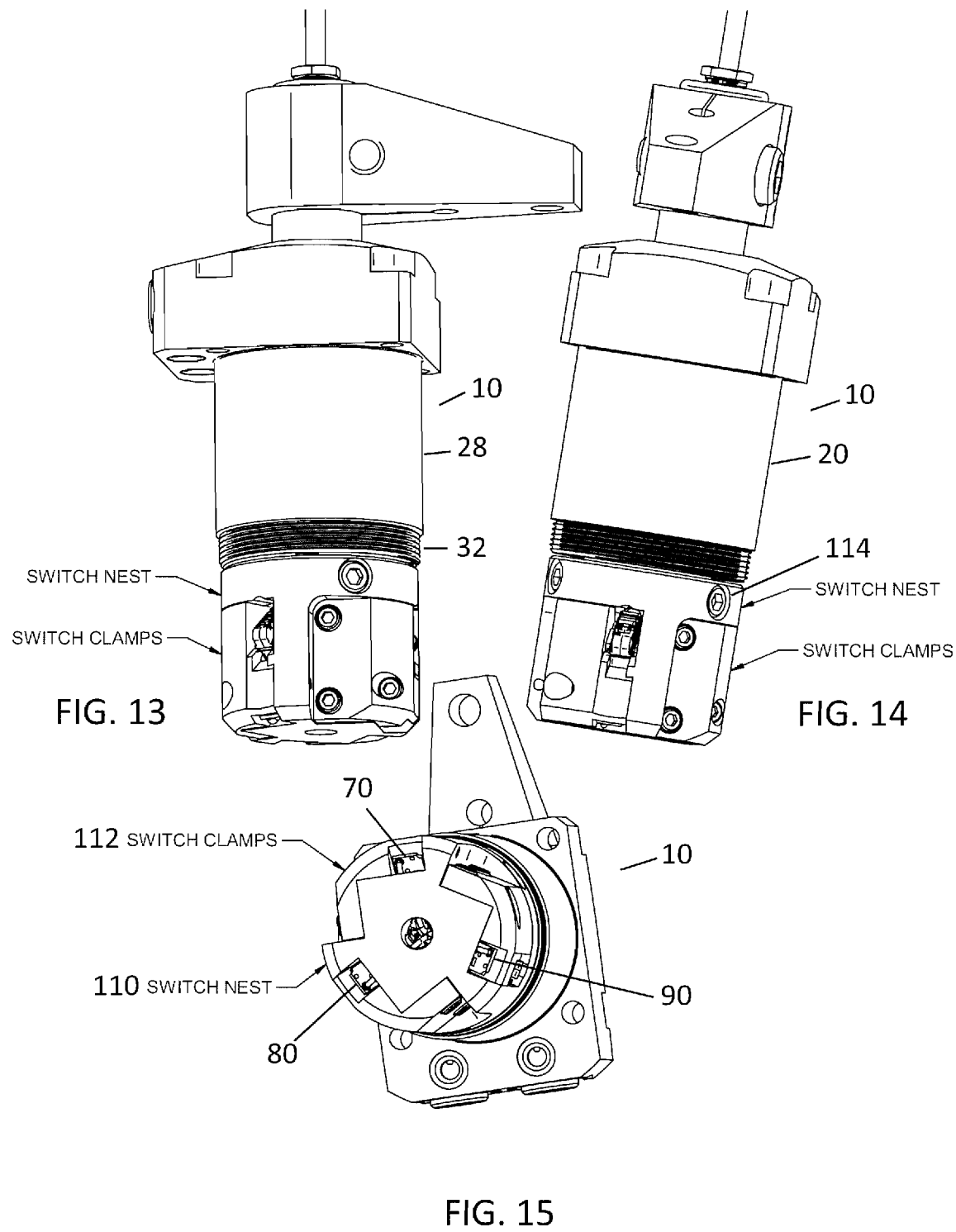

POSITION DETECTION DEVICE

FIELD OF THE INVENTION

The invention is directed to the field of position detection devices and, in particular, to a wireless position detecting device for clamps using energy harvesting microswitches.

BACKGROUND OF THE INVENTION

Clamps are used in an assortment of applications when immobilization of a workpiece is desired. In an industrial manufacturing environment, hydraulic or pneumatic clamps are utilized for their high force-to-size ratio and the ability to be controlled by an automated controller.

The use of clamps is benefited by a detecting device which projects a detecting rod from one end of a clamp rod to an area outside one end wall of a housing. For instance, a limit switch senses a moving condition of the detecting rod (for example, Japanese Patent Public Disclosure No. 2001-87991). However, the foregoing conventional technique has a problem, wherein cutting lubricant shortens the life span of the limit switch. Further, conventional limit switches require a large installation area and wires or air hoses that must route to a controller enclosure.

Known position detecting devices typically consist of a sensor fixed in relation to a drive element. In one example, a microswitch is attached to a movable portion of a drive element to indicate movement. Other types of sensors used include magnetic, spring loaded, ultrasonic, and the like. For instance, a magnetic sensor may employ a magnetic field using certain criteria in regards to density and configuration that provides measurement of a piston position. Ultrasonic position detection devices may comprise a torsion wave created in an acoustic wave guide, which is propagated at the end of the acoustic wave guide and converted into electrical pulses to provide measurement of a piston position. The time between the occurrence of such an electrical pulse and the initial current pulse renders possible the determination of positions.

In many cases, the actuation of the clamps is part of a much larger sequence of operations. In an instance where the clamp does not fully clamp or fully un-clamp, severe consequences could result depending upon the clamp position and resulting holding ability. To address the issue of clamp positioning, various devices have been utilized to detect the position of the clamps and provide feedback. One method is by using air pressure and the detection of the back pressure, such as that disclosed in U.S. Pat. No. 6,736,384 which is a device for detecting the condition of a clamp. The device employs compressed air, which is discharged to an exterior area through a recess to result in lowering the pressure of the air below a set pressure. The device makes it possible to detect the operation condition of a clamp rod by detecting the pressure of the pressurized air. The Applicant states that the use of compressed air inhibits deterioration due to the use of cutting lubricants or the like. The device further connects the actuation portion provided at one end portion of a clamp rod to a detecting member so that they can make a relative movement radially. The detecting member moves through the detecting hole to result in the possibility of detecting the operation of the clamp.

What is lacking in the industry is a wireless position detection device using energy harvesting microswitches.

SUMMARY OF THE INVENTION

The instant invention discloses an improved position detecting device which employs small, wireless, battery-less electronic switches into the clamps to detect various positions. The wireless aspect eliminates any wires or hoses that would normally run from the clamp to the control system. It also allows the clamps to be sealed to keep out liquid and debris. The battery-less aspect eliminates the un-reliability and up-keep associated with batteries. Additionally, the switch maintains a very compact physical size.

The device comprises a clamp body having a piston rod with three energy harvesting microswitches secured to a switch nest. The microswitches utilize pins for engaging a proximal end of the piston rod to detect movement. The piston rod includes predefined cutouts to actuate the switches at different positions. The position detecting device employs the highly reliable microswitch that actuates in an on-off position by piston rod movement to provide an economical, yet highly reliable, position detecting device. In the preferred embodiment, the microswitches are energy harvesting radio frequency (RF) switches. Each of the switches is connected to an independent antenna wherein each antenna fits within an antenna tube extending from a top of the position detecting device. The microswitches generate their own energy by the physical movement of the switch lever, and for transmission of certain RF signals to transmit certain information regarding the operation of the microswitches.

An objective of the invention is to provide a position detection device for use with a linear drive employing multiple energy harvesting microswitches to obtain the location of a piston rod in relation to a clamp body.

Another objective of the invention is to provide a simple and cost-effective position detection device using microswitches to reliably determinate linear movement.

Still another objective of the invention is to provide a position detection device employing three equally offset microswitches each having an antenna that is positioned within a common antenna tube extending outwardly from the body of the device.

Another objective of the invention is to use an antenna. Traditionally, industrial clamps are manufactured from metal components. These metal components block the transmission of the wireless signals. To resolve this issue, the piston rods of the instant invention are made with a central hole to allow the antennas to route out the top of the piston rod to open air. The antennas are protected with antenna tubes, and an antenna tube seals keeps liquid and debris from entering the piston rods.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DESCRIPTION OF THE DRAWINGS

FIG. 7 is an enlarged side view of a first microswitch in an activated position;

FIG. 8 is an enlarged side view of the first microswitch in a non-activated position;

FIG. 13 is a front view of the position detection device illustrating the switch nest;

FIG. 14 is a side view of the position detection device illustrating the switch nest; and FIG. 15 is a bottom view of the position detection device illustrating the switch nest.

DESCRIPTION OF THE PREFERRED EMBODIMENT

Figure 1:
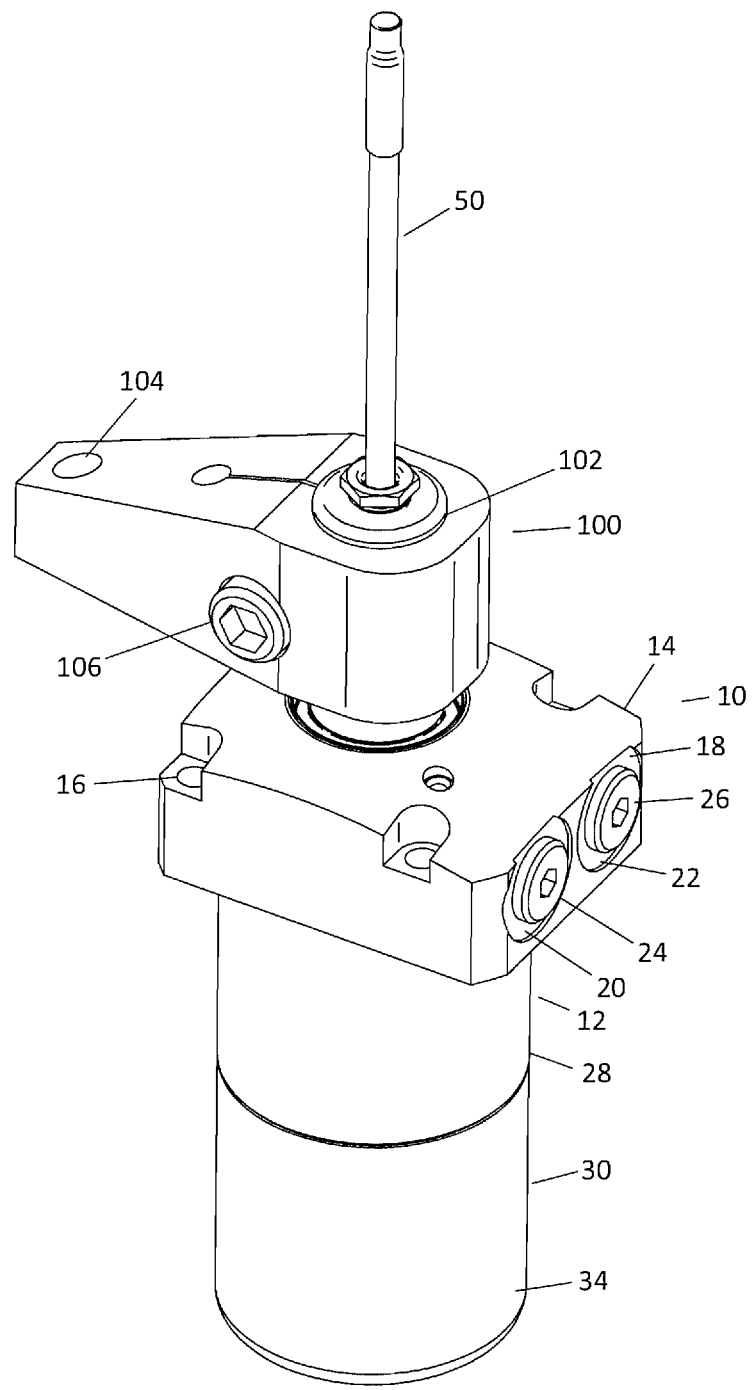
FIG. 1 is a perspective view of the position detection device.
Figure 2:
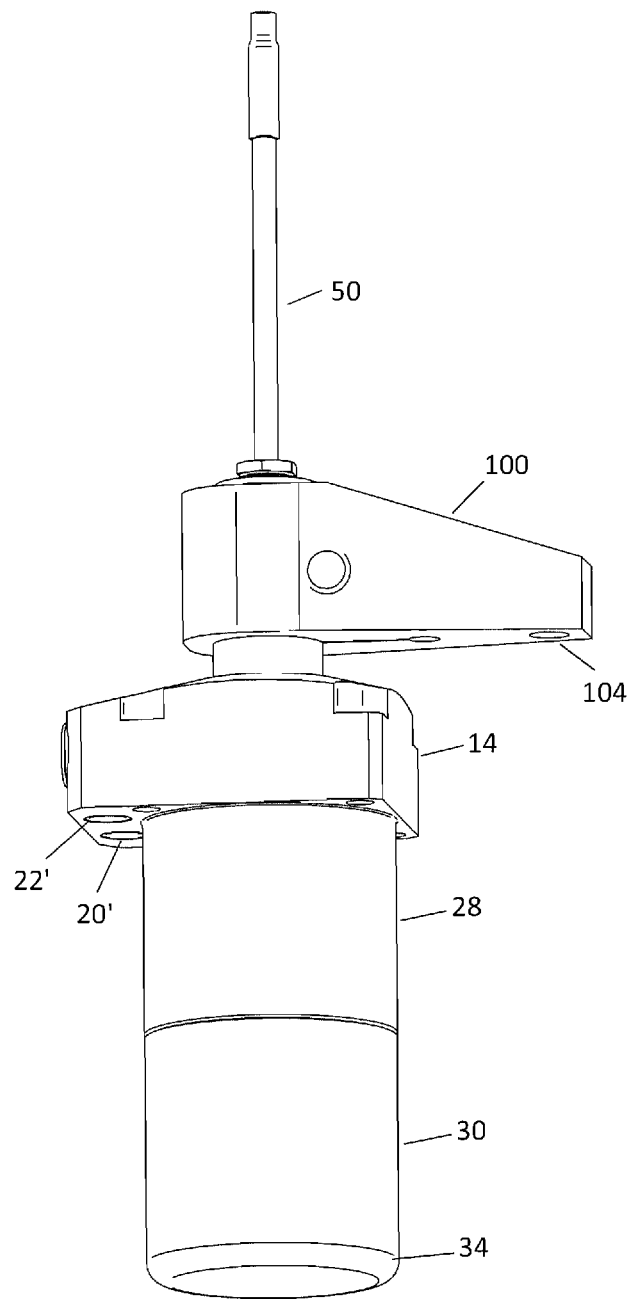
FIG. 2 is a front plane view thereof.
Figure 3:
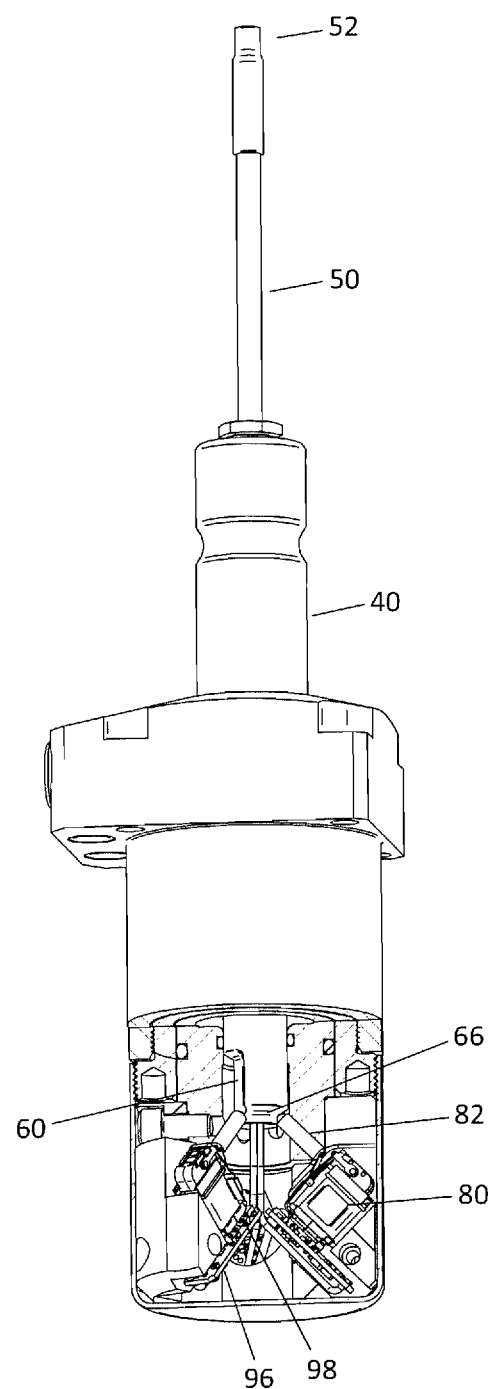
FIG. 3 is a side view with a cutaway of the clamp body.

Now referring to the Figures, set forth is a position detecting device comprising a clamp body 12 having a mounting base 14 that is secured to a product by use of fasteners, not shown, placed through four mounting apertures 16. The mounting base 14 is substantially rectangular in shape, having an access wall 18 for receipt of a fluid pressure through an inlet 20 and exhausted through an outlet 22. Alternatively, an inlet 20' and outlet 22' can be used as alternate ports, wherein inlet 20 can be capped with a plug 24, and outlet 22 can be capped with a plug 26. The clamp body 12 is further defined by an upper section 28 and a lower section 30. The upper section 28 has threads 32 wherein a cover 34 having reciprocal threads can be threadingly attached to the upper section 28.

A piston rod 40 has an upper end 42 extending outwardly from the mounting base 14, and a lower end 48 which terminates in the lower section 30 of the clamp body 12. An aperture 44 extends through the piston rod 40 for receipt of an antenna tube 50. The antenna tube 50 extends outwardly from the piston rod 40, ending at tip 52 a distance from the piston rod to provide optimum transmission of actuation signals. The antenna tube 50 includes a tube seal 55 and fastener 57 for securement to the clamp arm. The piston rod 40 lower end 48 includes cutouts defined as a first guide section 66 extending from the lower end 48 to a first ledge 62. The first guide section 66 is indented from the circumference of the piston rod 40 a distance equal to a microswitch throw distance, as will be explained later in this specification. A second guide section 60 extends from the lower end 48 to a second ledge 68, which is also indented from the circumference of the piston rod 40 a distance equal to a microswitch throw distance. The first and second guide sections operated as tracking grooves for the microswitch pins.

Referring to FIG. 7, a first microswitch 70 is attached to a switch nest 40 having an antenna 54 that extends into said antenna tube 50; the first microswitch 70 having a first pin 72 operatively associated with a first guide section 66. When the first pin 72 is outside the first guide section 66, the first pin 72 actuates the microswitch 70 by depressing the switch toggle 74. As depicted in FIG. 8, the first pin 72 is non-actuated, wherein the switch toggle 74 is illustrated in an open position. An integrated circuit (IC) 76 is coupled to the base 78 of the microswitch 70, taking power harnessed through the IC to provide a signal that the microswitch 70 has been activated. In operation, when the switch toggle 74 is actuated it moves a magnet located in the body 75 of each microswitch which transform mechanical movement of the switch toggle 74 across wire coils forming an electrical energy in the form of inductive voltage pulses wherein the IC 76 changes this voltage through rectification and immediate buffering into a constant voltage that is used for transmission of an antenna signal.

The microswitch 70 is a "zero-power" wireless transmitter for its capability of providing sensor data directly on a wireless channel. The "battery-less" approach allows the position detecting device to be placed in most any remote position, as there is no need for power to be wired to the device for purposes of operation or signal production. The concept for harvesting energy from an RF source involves the receipt of the desired wireless signals and the use of the IC 76, which includes rectifying circuitry to convert the wireless energy to DC power.

Figure 9:
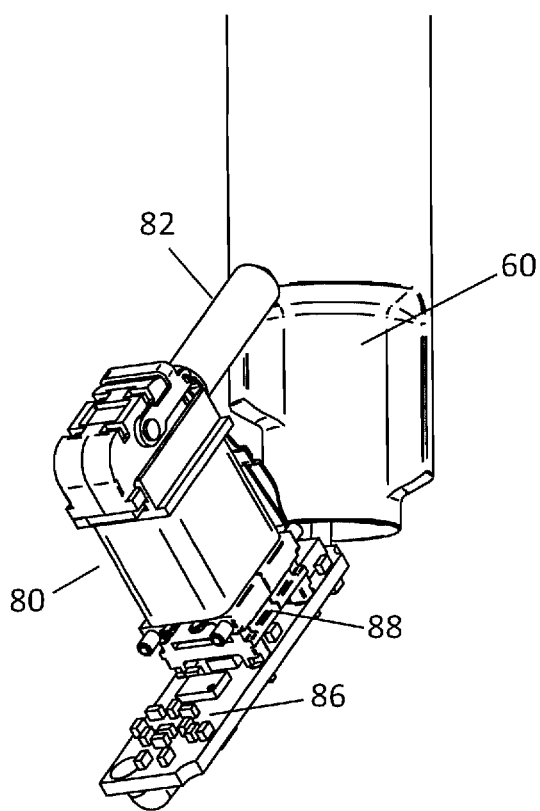
FIG. 9 is an enlarged perspective view of a second microswitch in an activated position.
Figure 10:
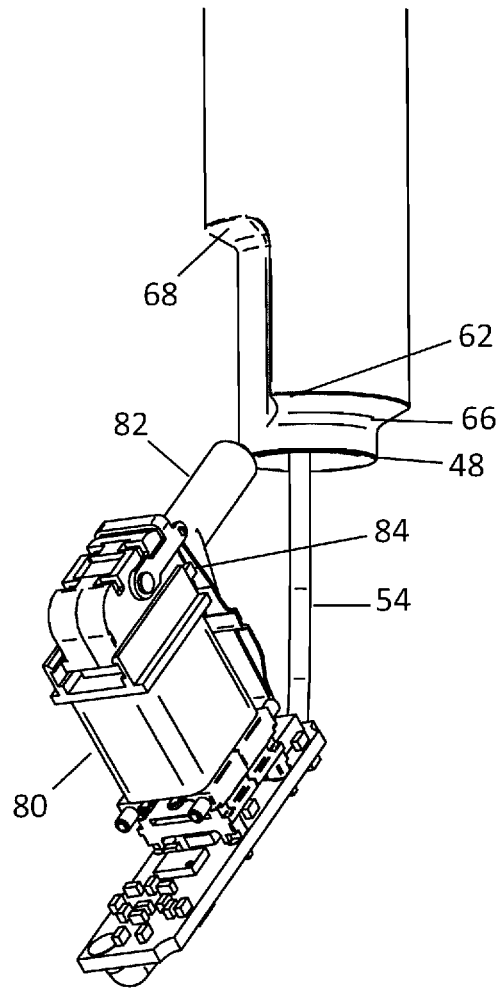
FIG. 10 is an enlarged perspective view of the second microswitch in a non-activated position.
Figure 12:
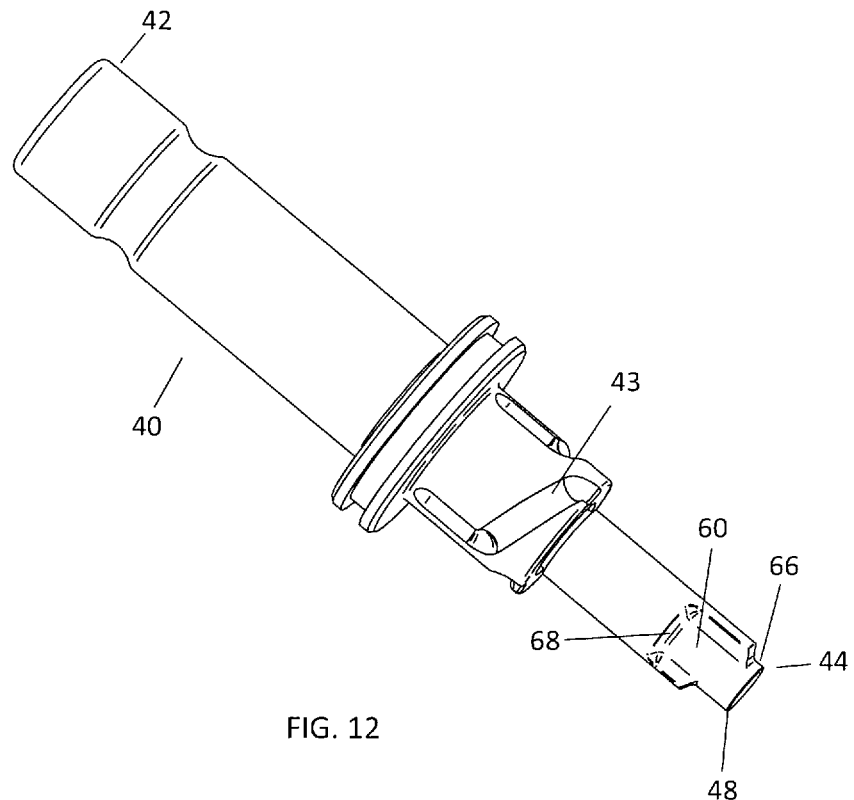
FIG. 12 is a side view of the piston rod.

Referring to FIG. 9, a second microswitch 80 is attached to a distal end 54 of the piston rod 40; the second microswitch 80 having a second pin 82 operatively associated with a second guide section 60. When the second pin 82 is outside the second guide section 60, the second pin 82 actuates the microswitch 80 by depressing the switch toggle 84. As depicted in FIG. 10, the second pin 82 is non-actuated, wherein the switch toggle 84 is illustrated in an open position. An integrated circuit (IC) 86 is coupled to the base 88 of the microswitch 80, taking power harnessed through the IC 86 to provide a signal that the microswitch 80 has been activated.

Figure 11:
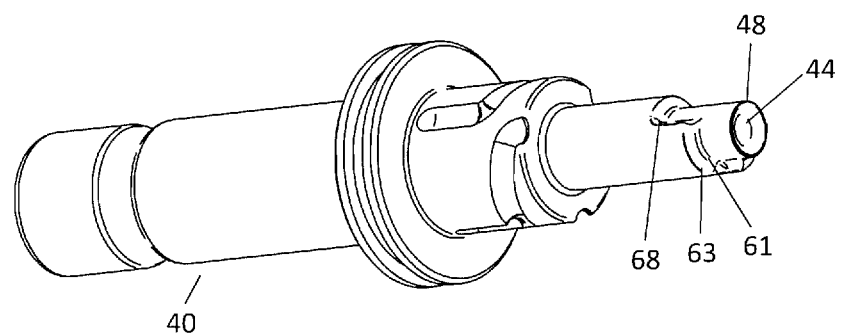
FIG. 11 is a front end plane view of a piston rod.

A third microswitch 90 is attached to a distal end 54 of the piston rod 40; the third microswitch 90 having a third pin 92 operatively associated with a third guide section 61 that extend from ridge 63 to lower end 48 depicted in FIG. 11. When the third pin 92 is outside the guide sections, the third pin 92 actuates the microswitch 90. An integrated circuit (IC) coupled to the base of the microswitch 90, taking power harnessed through the IC 96, provides a signal that the microswitch 90 has been activated. The cutouts defined as guide sections 60, 61 and 66 are constructed and arranged to coincide with the required throw of the microswitch. In the preferred embodiment the microswitches are interchangeable and, depending on the placement of the cutouts, wherein the three microswitches can be designed to indicate various positions of the piston rod. In the preferred embodiment, the displacement of the pins provide an indication of piston storage, IA extension, or full extension. It should be noted that while three switches are depicted, less switches can be used if less position detection is required, and more switches can be used if more position detection is required.

A clamp arm 100 has a first aperture 102 securable to the upper end 41 of the piston rod 40 and a second aperture 104 spaced apart from the first aperture 102. The second aperture 104 allows for attachment to a product whose movement is to be detected. The clamp arm 100 has an adjustment screw 106 for changing the diameter of the first aperture 102 to assure positive coupling to the piston rod 40.

Figure 4:
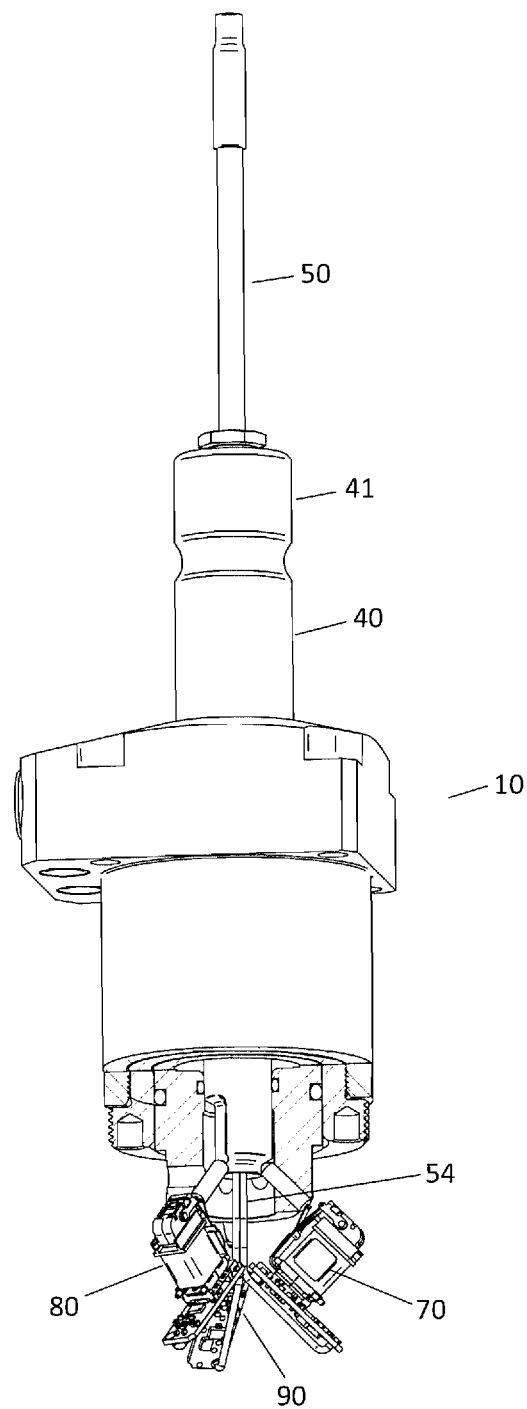
FIG. 4 is a side view with the housing removed from the lower portion of the clamp body illustrating a non-activated position.
Figure 5:
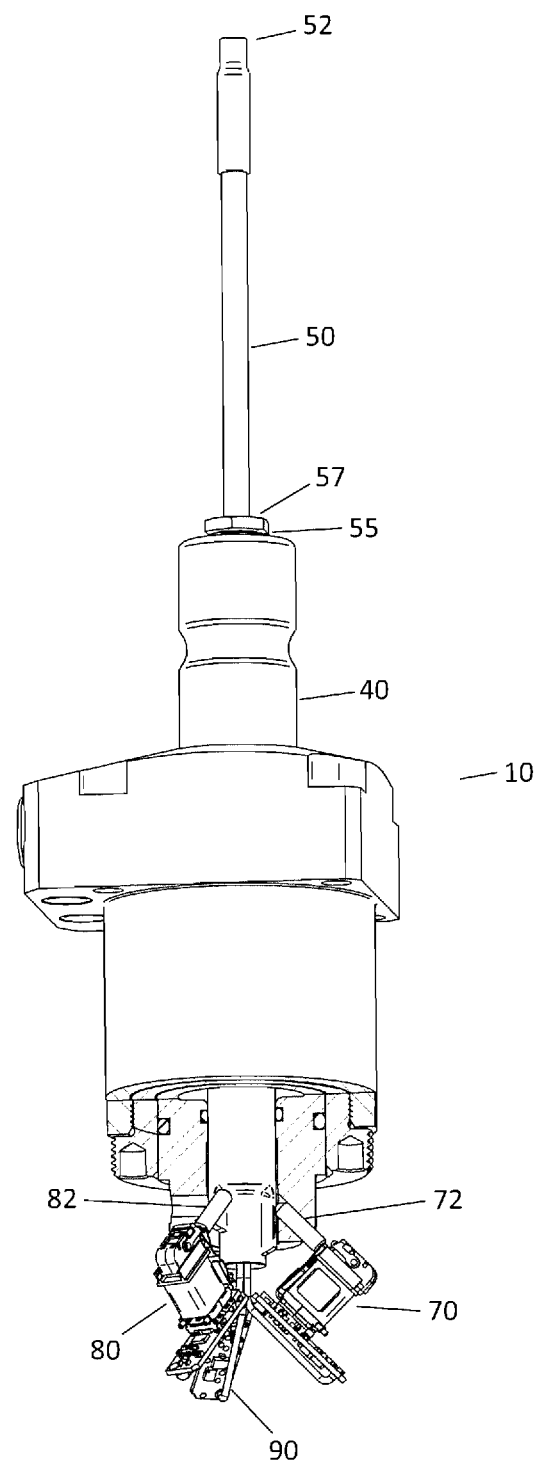
FIG. 5 is a side view with the housing removed from the lower portion of the clamp body illustrating a partially activated position.
Figure 6:
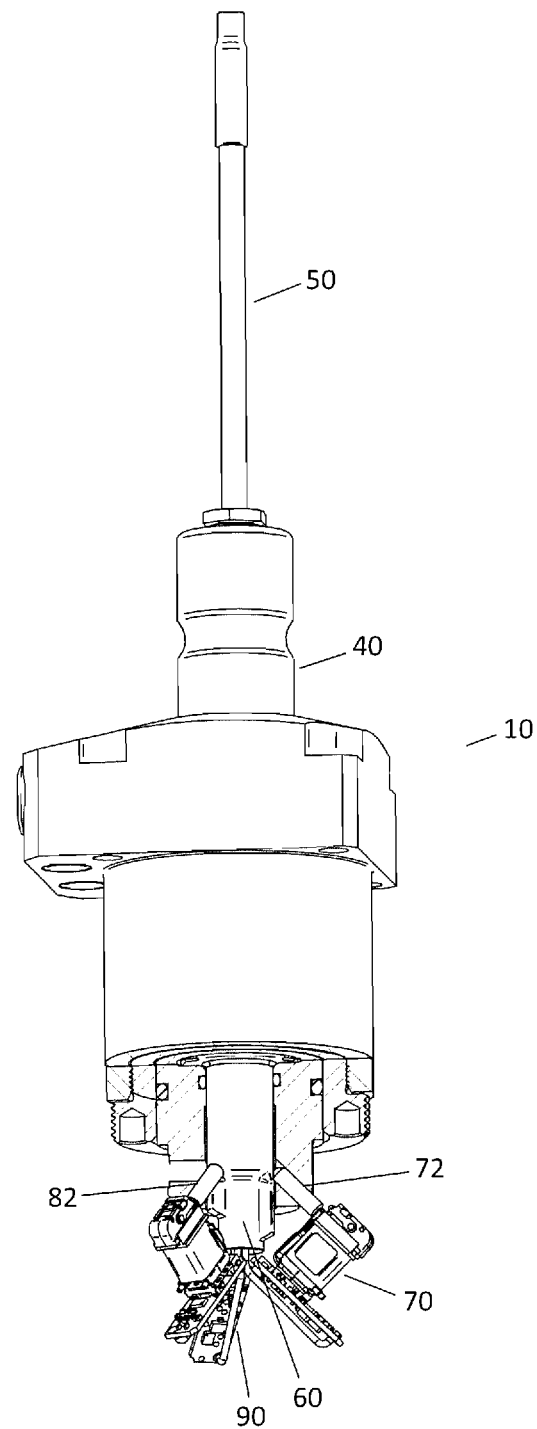
FIG. 6 is a side view with the housing removed from the lower portion of the clamp body illustrating a fully activated position.

Now referring to FIGS. 4-6, set forth is a cut away view depicting the three energy harvesting microswitches 70, 80, 90 operating in response to the piston rod 40 position, which is movable in linear and/or radial motion, wherein the pins 72, 82, and 92 actuate to provide a signal of actuation.

FIGS. 13-15 depict the position detecting device 10 wherein the cover is removed and the microswitches 70, 80, and 90 are held in position with a switch nest 110 that is secured to the clamp body 12 upper section 28 with fasteners 114. Switch clamps 112 secure each microswitch to the switch nest 110

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A position detecting device comprising:
a clamp body;
a piston rod having an upper end extending outwardly from a mounting base positioned on an upper portion of said clamp body, and a lower end terminating in a lower section of said clamp body, said piston lower end including a plurality of cutouts, wherein said plurality of cutouts comprises a first guide section, a second guide section, and a third guide section;
an antenna tube having a proximal end extending through said piston rod;
a first microswitch attached to a distal end of an antenna, said first microswitch having a first pin operatively associated with the first guide section, wherein said first microswitch is unactuated when said piston rod is in a first position of the first microswitch and said first microswitch is actuated when said piston rod is in a second position of the first microswitch and a first RF signal is transmitted through said antenna, said antenna is positioned within said antenna tube;
a second microswitch attached to said distal end of said antenna, said second microswitch having a second pin operatively associated with said second guide section, wherein said second microswitch is unactuated when said piston rod is in a first position of the second microswitch and said second microswitch is actuated when said piston rod is in a second position of the second microswitch and a second RF signal is transmitted through said antenna;
a third microswitch attached to said distal end of said antenna, said third microswitch having a third pin operatively associated with said third guide section, wherein said third microswitch is unactuated when said piston rod is in a first position of the third microswitch and said third microswitch is actuated when said piston rod is in a second position of the third microswitch and a third RF signal is transmitted through said antenna positioned; and
a clamp arm securable to said piston rod;
wherein a displacement between said clamp arm and said clamp body causes a movement of said piston rod, wherein the first microswitch is actuated according to the movement of said first pin, wherein the first pin is actuated by the movement of the first guide section of the piston rod, wherein the second and third microswitches are actuated in the same manner as the first microswitch.

2. The position detecting device according to claim 1, wherein each said microswitch is an energy harvesting RF switch.

3. The position detecting device according to claim 1, wherein said clamp arm has a first aperture securable to said upper end of said piston rod and a second aperture spaced apart from said first aperture.

4. The position detecting device according to claim 3, wherein said first aperture is adjustable in diameter.

5. The position detecting device according to claim 1, wherein said first guide section, said second guide section and said third guide section are each of a different length.

6. The position detection device according to claim 1, characterized in that said clamp body includes a cylinder, and said piston rod moves in said cylinder.

7. The position detection device according to claim 1, wherein said pins are adjustable for engaging said guide sections.

8. The position detection device according to claim 1, wherein said microswitches are interchangeable.

* * * * *